(12) United States Patent
Oveyssi et al.

(10) Patent No.: US 6,970,329 B1
(45) Date of Patent: Nov. 29, 2005

(54) DISK DRIVE HAVING A VCM PLATE WHICH INCLUDES AN INTEGRALLY FORMED ELONGATED PROTRUSION FOR SECURING A FLEX BRACKET TO THE DISK DRIVE BASE

(75) Inventors: Kamran Oveyssi, San Jose, CA (US); Shufun Ho, Fremont, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 206 days.

(21) Appl. No.: 10/676,586

(22) Filed: Sep. 30, 2003

(51) Int. Cl.[7] .............................................. G11B 5/55
(52) U.S. Cl. ................................. 360/264.8; 360/264.2
(58) Field of Search ........................... 360/264.8, 264.2

(56) References Cited

U.S. PATENT DOCUMENTS 4,965,684 A * 10/1990 Stefansky ................ 360/78.12
5,905,609 A * 5/1999 Butler et al. ............. 360/264.8

* cited by examiner

Primary Examiner—Robert S. Tupper

(57) ABSTRACT

A disk drive includes a disk drive base, a spindle motor attached to the disk drive base, a disk supported by the spindle motor, and a head stack assembly coupled to the disk drive base. The head stack assembly includes an actuator body, a coil portion cantilevered from the actuator body, an actuator arm cantilevered from the actuator body in an opposite direction from the actuator arm, a flex circuit cable having an electrical connector end, and a flex bracket for clamping the electrical connector end of the flex circuit cable to the disk drive base, the flex bracket having first and second ends being spaced-apart along a width of the disk drive. The disk drive further includes an upper voice coil motor plate and a lower voice coil motor plate, the voice coil motor plates secured to the disk drive base, one of the voice coil motor plates having an integrally formed elongated protrusion extending from the voice coil motor plate for contacting and securing the flex bracket to the disk drive base, the elongated protrusion extending from the first end to proximate the second end, wherein the flex bracket is secured to the disk drive base free of using any fastener.

5 Claims, 4 Drawing Sheets

DISK DRIVE HAVING A VCM PLATE WHICH INCLUDES AN INTEGRALLY FORMED ELONGATED PROTRUSION FOR SECURING A FLEX BRACKET TO THE DISK DRIVE BASE

BACKGROUND OF THE INVENTION

1. Field of the Invention

This invention relates to a voice coil motor ("VCM") plate of a disk drive. In particular, this invention relates to an integrally formed elongated protrusion extending from a voice coil motor plate for securing a flex bracket to the disk drive base free of using any fastener.

2. Description of the Prior Art and Related Information

A huge market exists for disk drives such as hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 40 gigabytes per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a disk drive base and a cover, at least one disk having at least one recording surface, a spindle motor for causing each disk to rotate, and an actuator arrangement. The printed circuit board assembly includes circuitry for processing signals and controlling operations. Actuator arrangements can be characterized as either linear or rotary; substantially every contemporary cost-competitive small form factor drive employs a rotary actuator arrangement.

With reference to FIG. 9, a prior art disk drive 200 includes a cover 202, a disk drive base 204, and a printed circuit board assembly 206 attached to disk drive base 204. Disk drive 200 further includes a spindle motor 208, a disk 210 having top 212 and bottom 214 recording surfaces, a head stack assembly 226, and a voice coil motor plate arrangement including an upper voice coil motor plate 216 having an upper permanent magnet 218 and a lower voice coil motor plate 220 having a lower permanent magnet 222. Head stack assembly 226 includes an actuator body 228, a pair of actuator arms 230, 232, a coil portion 242, and a flex circuit assembly having a flex bracket 244, also known as a "flex clamp." Head stack assembly 226 pivots relative to a pivot axis 246 defined by a bore within actuator body 228. A pair of head gimbal assemblies 234, 236 are attached to the pair of actuator arms 230, 232. Head gimbal assembly 234 includes a slider (also known as a "head") 238 and head gimbal assembly 236 includes a slider 240.

As shown in FIG. 9, flex bracket 244 is attached to disk drive base 204 via a pair of metal screws 248 which are disposed through a pair of corresponding holes in flex bracket 244 and corresponding threaded holes in disk drive base 204. However, such screws use valuable manufacturing time during assembly of the head disk assemblies and have the potential to increase contamination within the interior of the head disk assemblies by generating particulates.

SUMMARY OF THE INVENTION

This invention can be regarded as a disk drive including a disk drive base, a spindle motor attached to the disk drive base, a disk supported by the spindle motor, and a head stack assembly coupled to the disk drive base. The head stack assembly includes an actuator body, a coil portion cantilevered from the actuator body, an actuator arm cantilevered from the actuator body in an opposite direction from the arm, a flex circuit cable having an electrical connector end, and a flex bracket for clamping the electrical connector end of the flex circuit cable to the disk drive base, the flex bracket having first and second ends being spaced-apart along a width of the disk drive. The disk drive further includes an upper voice coil motor plate and a lower voice coil motor plate, the voice coil motor plates secured to the disk drive base, one of the voice coil motor plates having an integrally formed elongated protrusion extending from the voice coil motor plate for contacting and securing the flex bracket to the disk drive base, the elongated protrusion extending from the first end to proximate the second end, wherein the flex bracket is secured to the disk drive base free of using any fastener.

In a preferred embodiment, the elongated protrusion extends from the upper voice coil motor plate.

DETAILED DESCRIPTION

Figure 1:
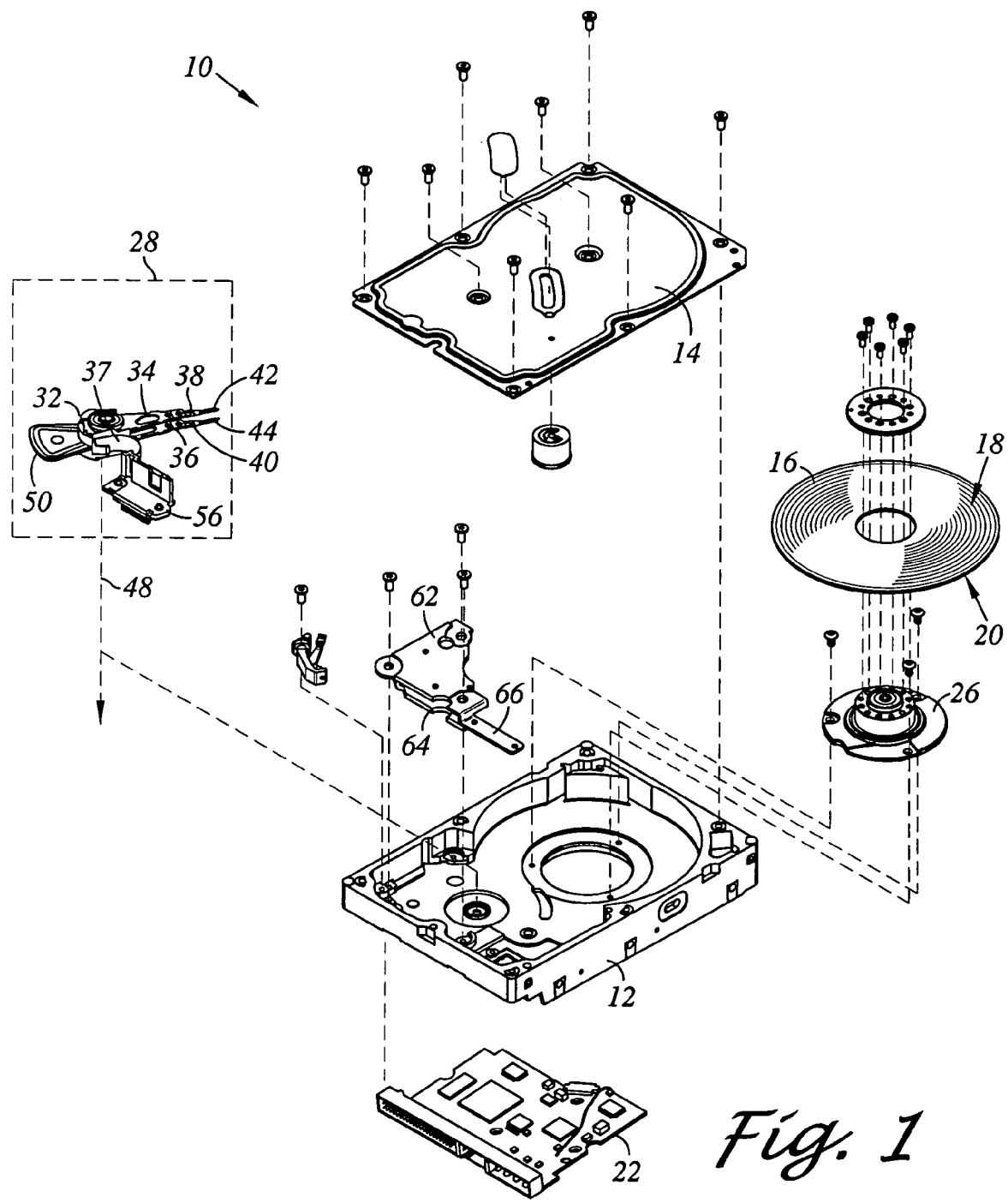
FIG. 1 is an exploded perspective view of a disk drive incorporating an embodiment of this invention.
Figure 2A:
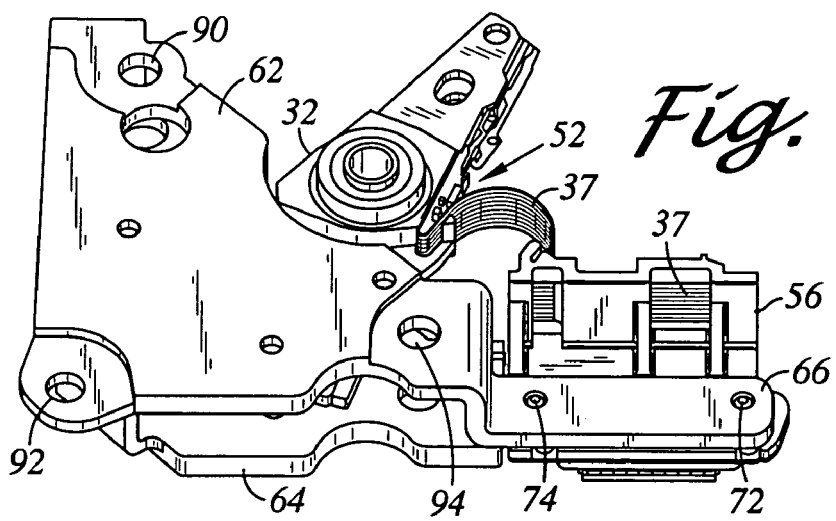
FIG. 2A is partial perspective view of a voice coil motor plate arrangement in combination with a portion of a head stack assembly in accordance with an embodiment of this invention.
Figure 2B:
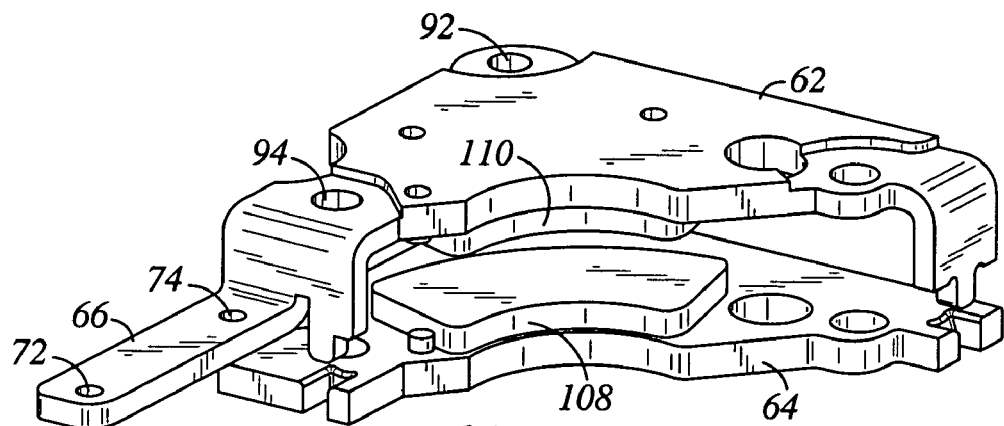
FIG. 2B is a perspective view of the voice coil motor plate arrangement shown in FIG. 2A prior to its attachment to the disk drive base.

With reference to FIGS. 1, 2A, and 2B, a disk drive 10 includes a disk drive base 12, a spindle motor 26 attached to disk drive base 12, a disk 16 supported by spindle motor 26, and a head stack assembly 28 coupled to disk drive base 12. Head stack assembly 28 includes an actuator body 32, a coil portion 50 cantilevered from actuator body 32, an actuator arm 34 cantilevered from actuator body 32 in an opposite direction from actuator arm 34, a flex circuit cable 37 having an electrical connector end 54 (see FIG. 5), and a flex bracket 56 for clamping electrical connector end 54 of flex circuit cable 37 to disk drive base 12, flex bracket 56 having first 58 and second 60 ends (see FIG. 3) being spaced-apart along a width of disk drive 10. Disk drive 10 further includes an upper voice coil motor plate 62 and a lower voice coil motor plate 64, the voice coil motor plates secured to disk drive base 12, one of the voice coil motor plates 62, 64 having an integrally formed elongated protrusion 66 extending from the voice coil motor plate for contacting and securing flex bracket 56 to disk drive base 12, elongated protrusion 66 extending from first end 58 to proximate second end 60, wherein flex bracket 56 is secured to disk drive base 12 free of using any fastener.

Continuing with FIG. 1, disk drive 10 further includes a disk drive cover 14 and a printed circuit board assembly 22 attached to disk drive base 12. Disk 16 includes a first recording surface 18 and a second recording surface 20 opposite from first recording surface 18. Head stack assembly 28 pivots relative to a pivot axis 48 defined by a bore within actuator body 32 and includes a pair of actuator arms 36, 34. Head stack assembly 28 further includes a head gimbal assembly 40 attached to actuator arm 36 and having a slider 44. A head gimbal assembly 38 is attached to actuator arm 34 and includes a slider 42. In the embodiment shown in FIG. 1, disk drive 10 includes a single disk, i.e., disk 16. However, in alternative embodiments, a plurality of disks, such as two or three disks, may be used in conjunction with corresponding head gimbal assemblies suitably attached to a given actuator arm. For example, in an embodiment in which a disk drive includes two disks, four head gimbal assemblies may be used.

Continuing with FIGS. 2A and 2B, flex circuit cable 37 includes an actuator body end 52 which is attached to actuator body 32 and upper voice coil motor plate 62 includes holes 90, 92, and 94, and an upper permanent magnet 110. Elongated protrusion 66 includes a pair of holes 72, 74 which align with a pair of location pins on flex bracket 56, to be described in more detail later. Lower voice coil motor plate 64 includes a lower permanent magnet 108. As best shown in FIG. 1, upper and lower voice coil motor plates 62, 64 are attached to disk drive base 12 via a plurality of screws which are disposed in the corresponding holes in the voice coil motor plates and corresponding holes defined in the disk drive base. Hence, the application of such screws results in elongated protrusion 66 applying a sufficient compressive force onto flex bracket 56 such that flex bracket 56 is attached to disk drive base 12. For example, a compressive force of about 150 pounds may be used. In one embodiment, elongated protrusion 66 extends from upper voice coil motor plate 62. In an alternative embodiment, elongated protrusion 66 may extend from lower voice coil motor plate 64. Suitably, elongated protrusion 66 is a generally rectangular-shaped protrusion as shown in FIG. 2A and may be formed by a bending operation. Significantly, the use of elongated protrusion 66 precludes the need to use screws to attach flex bracket 56 to disk drive base 12 which decreases the manufacturing time of assembling the head disk assemblies and reduces the generation of particulates within the interior of the head disk assemblies.

Figure 3:
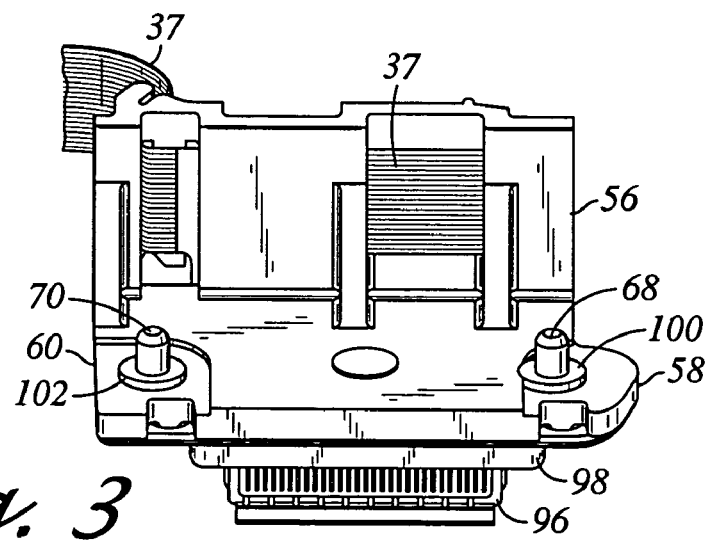
FIG. 3 is a perspective view of a portion of flex circuit assembly in accordance with an embodiment of this invention.
Figure 4:
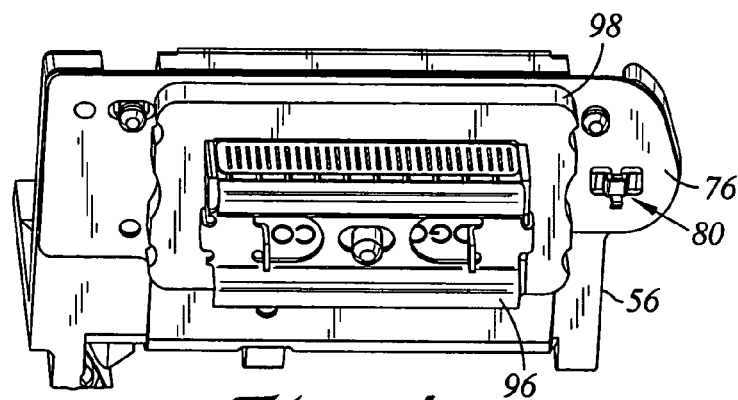
FIG. 4 is a perspective view of the bottom of the flex circuit assembly shown in FIG. 3.

With reference to FIGS. 3 and 4 which collectively show a portion of a flex circuit cable assembly, flex bracket 56 includes a pair of location pins 68, 70, each location pin extending from a respective annular-shaped member 100, 102. A gasket 98 and a flex connector 96 are attached to flex bracket 56. Flex connector 96 is disposed through a corresponding aperture within disk drive base 12 for connection to printed circuit board assembly 22. As shown in FIG. 3 in conjunction with FIG. 2A, location pin 70 is disposed through hole 74 and location pin 68 is disposed through hole 72. Annular-shaped members 100 and 102 allow for concentration of the compressive force on flex bracket 56 for its attachment to disk drive base 12.

Figure 5:
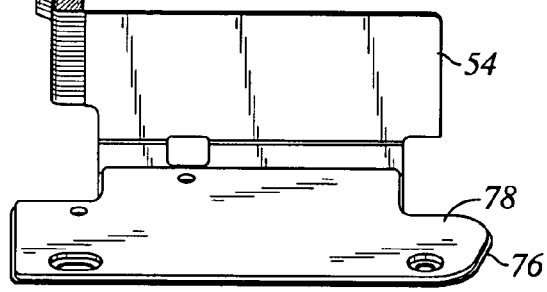
FIG. 5 is a perspective view of a portion of FIG. 3 showing the electrical connector end of the flex circuit cable.
Figure 6:
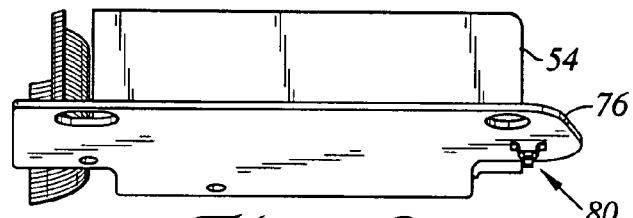
FIG. 6 is a perspective view of the underside of FIG. 5 showing a ground portion in accordance with an embodiment of this invention.

With reference to FIGS. 4, 5, and 6, electrical connector end 54 of flex circuit cable 37 includes a distal flex portion 76 and a metal plate 78 attached to distal flex portion 76. Distal flex portion 76 includes ground portion 80.

Figure 7:
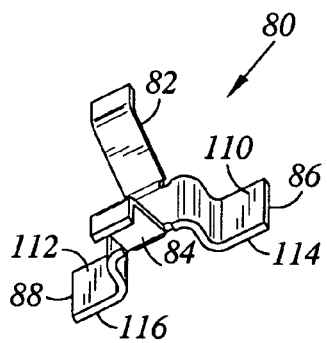
FIG. 7 is perspective view of the ground portion shown in FIG. 6.
Figure 8:
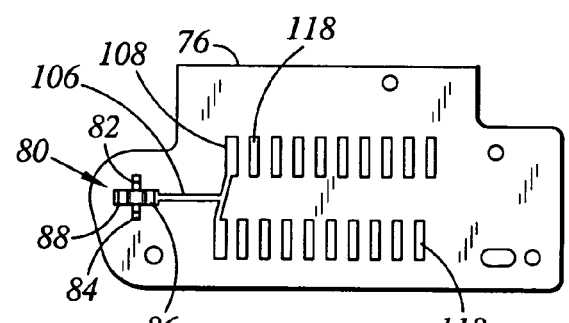
FIG. 8 is a plan view of a distal flex portion including a ground portion in accordance with an embodiment of this invention.
Figure 9:
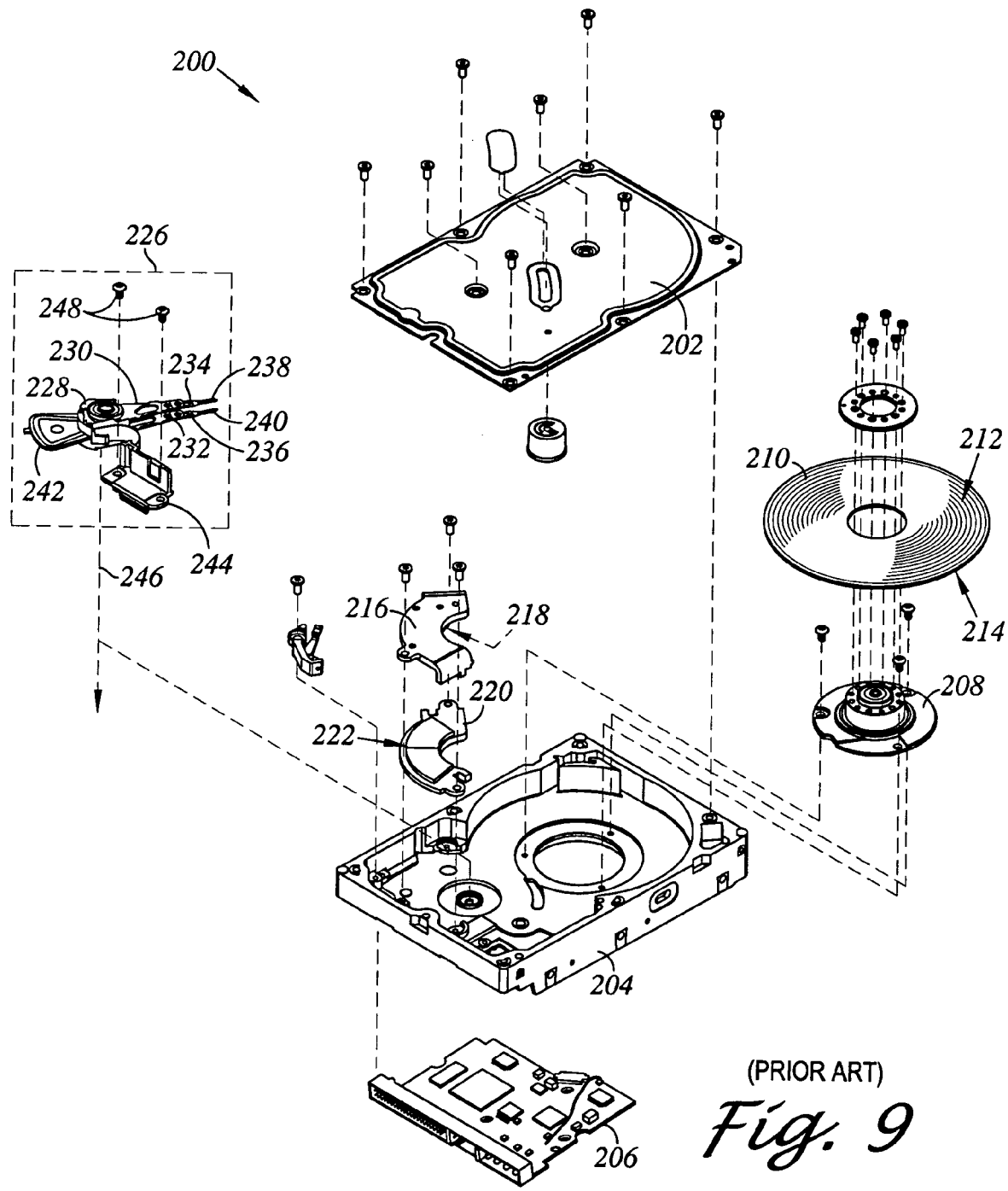
FIG. 9 is an exploded perspective view of a prior art disk drive.

With reference to FIGS. 7 and 8, ground portion 80 includes a pair of tabs 82, 84 for contacting disk drive base 12. In one embodiment, tabs 82, 84 are inserted into a corresponding blind aperture in disk drive base 12 for grounding. Ground portion 80 further includes additional tabs 86, 88 having surfaces 114, 116 and such tabs are attached to corresponding ground pads on distal flex portion 76 via attachment surfaces 110 and 112. Suitably, ground portion 80 may be formed from a material having spring-like characteristics such as beryllium copper. Suitably, surfaces 110, 112 may be plated with tin to facilitate the attachment of such surfaces to respective ground pads via soldering. Distal flex portion 76 includes a ground trace 106 which includes pads 108. As shown in FIG. 8, tabs 86, 88 are aligned horizontally along ground trace 106, each tab being soldered onto a respective ground pad along ground trace 106. Pads 108 as well as the remaining pads 118 are connected to corresponding leads on flex connector 96 via soldering.

What is claimed is:

1. A disk drive comprising:
   a disk drive base;
   a spindle motor attached to the disk drive base;
   a disk supported by the spindle motor;
   a head stack assembly coupled to the disk drive base;
   the head stack assembly including:
   an actuator body;
   a coil portion cantilevered from the actuator body;
   an actuator arm cantilevered from the actuator body in an opposite direction from the actuator arm;
   a flex circuit cable having an electrical connector end;
   a flex bracket for clamping the electrical connector end of the flex circuit cable to the disk drive base, the flex bracket having first and second ends being spaced-apart along a width of the disk drive; and
   an upper voice coil motor plate and a lower voice coil motor plate, the voice coil motor plates secured to the disk drive base, one of the voice coil motor plates having an integrally formed elongated protrusion extending from the voice coil motor plate for contacting and securing the flex bracket to the disk drive base, the elongated protrusion extending from the first end to proximate the second end, wherein the flex bracket is secured to the disk drive base free of using any fastener.

2. The disk drive of claim 1, wherein the elongated protrusion extends from the upper voice coil motor plate.

3. The disk drive of claim 1, wherein the flex bracket includes a pair of location pins and the elongated protrusion includes a pair of holes, each location pin being disposed in a respective hole.

4. The disk drive of claim 1, wherein the electrical connector end of the flex circuit cable includes a distal flex portion and a metal plate attached to the distal flex portion, the distal flex portion including a ground portion.

5. The disk drive of claim 4, wherein the ground portion includes a pair of tabs for contacting the disk drive base.

* * * * *